US009109648B2

(12) United States Patent
Hiasa et al.

(10) Patent No.: US 9,109,648 B2
(45) Date of Patent: Aug. 18, 2015

(54) CONTROL DEVICE FOR VEHICLE

(75) Inventors: Yasuhiro Hiasa, Nagoya (JP); Atsushi Tabata, Okazaki (JP); Tooru Matsubara, Toyota (JP); Tatsuya Imamura, Okazaki (JP); Kenta Kumazaki, Toyota (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 0 days.

(21) Appl. No.: 14/352,704

(22) PCT Filed: Oct. 21, 2011

(86) PCT No.: PCT/JP2011/074298
§ 371 (c)(1),
(2), (4) Date: Apr. 18, 2014

(87) PCT Pub. No.: WO2013/057831
PCT Pub. Date: Apr. 25, 2013

(65) Prior Publication Data
US 2014/0257618 A1  Sep. 11, 2014

(51) Int. Cl.
*F16D 48/06* (2006.01)
*B60K 6/48* (2007.10)
(Continued)

(52) U.S. Cl.
CPC . *F16D 48/06* (2013.01); *B60K 6/48* (2013.01); *B60W 10/02* (2013.01); *B60W 10/08* (2013.01); *B60W 10/115* (2013.01); *B60W 20/00* (2013.01); *B60W 30/18045* (2013.01); *B60W 30/18118* (2013.01); *B60K 2006/4825* (2013.01); *B60W 2510/244* (2013.01); *B60W 2520/06* (2013.01);
(Continued)

(58) Field of Classification Search
CPC ............ B60K 6/48; B60K 2006/4825; B60W 2710/027; B60W 20/00; B60W 10/08; B60W 30/115; B60W 30/18118; B60W 2710/081; B60W 2710/086; B60W 30/18045; B60W 2510/244; B60W 2520/06; Y02T 10/6221; Y02T 10/6252; Y02T 10/7258; Y10S 903/946
USPC .......................................................... 701/23
See application file for complete search history.

(56) References Cited

U.S. PATENT DOCUMENTS 5,931,757 A   8/1999 Schmidt
5,935,035 A   8/1999 Schmidt
(Continued)

FOREIGN PATENT DOCUMENTS

DE  102008046014 A1  5/2009
DE  112009004859 A5  5/2012
(Continued)

*Primary Examiner* — Mary Cheung
*Assistant Examiner* — Yuen Wong
(74) *Attorney, Agent, or Firm* — Kenyon & Kenyon LLP

(57) ABSTRACT

A hybrid vehicle includes a clutch on a power transmission path between a motor generator and a driving wheel. If the vehicle moves backward when the vehicle starts forward acceleration from standstill on an ascending slope, the charging level of the battery that is attributable to power generation by the motor generator due to the backward travel is compared with a current maximum charging power of the battery. If the charging level of the battery is greater, the quantity of slippage of the clutch is controlled according to the excess to lower the rotational speed of the motor generator, hence to lower the power generation. That enables an increase in the torque of the motor generator within the range in which the battery may be charged. Performance is thus improved during acceleration from standstill.

20 Claims, 9 Drawing Sheets

(51) Int. Cl.

| | |
|---|---|
| *B60W 10/02* | (2006.01) |
| *B60W 20/00* | (2006.01) |
| *B60W 10/08* | (2006.01) |
| *B60W 10/115* | (2012.01) |
| *B60W 30/18* | (2012.01) |

(52) U.S. Cl.
CPC .... *B60W 2710/027* (2013.01); *B60W 2710/081* (2013.01); *B60W 2710/086* (2013.01); *Y02T 10/6221* (2013.01); *Y02T 10/6252* (2013.01); *Y02T 10/7258* (2013.01); *Y10S 903/946* (2013.01)

(56) References Cited

U.S. PATENT DOCUMENTS

| | | | |
|---|---|---|---|
| 8,275,503 | B2 | 9/2012 | Izumi |
| 2007/0199745 | A1* | 8/2007 | Hayashi ................ 180/65.2 |
| 2009/0082171 | A1 | 3/2009 | Conlon et al. |
| 2012/0072065 | A1 | 3/2012 | Minamikawa et al. |

FOREIGN PATENT DOCUMENTS

| | | | |
|---|---|---|---|
| EP | 0967102 | B1 | 12/1999 |
| EP | 0967103 | B1 | 12/1999 |
| JP | 2000-062483 | A | 2/2000 |
| JP | 2000-069611 | A | 3/2000 |
| JP | 2005-299843 | A | 10/2005 |
| JP | 2007-069787 | A | 3/2007 |
| JP | 2010-018215 | A | 1/2010 |
| JP | 2010-058557 | A | 3/2010 |
| JP | 2010-115059 | A | 5/2010 |
| JP | 2010-188807 | A | 9/2010 |
| JP | 2010-269632 | A | 12/2010 |
| JP | 2010-274705 | A | 12/2010 |
| JP | 2011-052807 | A | 3/2011 |
| JP | 2011-088595 | A | 5/2011 |
| JP | 2011-126379 | A | 6/2011 |

* cited by examiner

FIG.3

|     | C1 | C2 | C3 | C4 | B1 | B2 | B3 | B4 | F0 | F1 | F2 | F3 |
|-----|----|----|----|----|----|----|----|----|----|----|----|----|
| P   | ×  | ×  | ×  | ×  | ×  | ×  | ×  | ×  | ×  | ×  | ×  | ×  |
| R   | ×  | ×  | ○  | ×  | ◎  | ×  | ×  | ○  | ×  | ○  | ×  | ×  |
| N   | ×  | ×  | ×  | ×  | ×  | ×  | ×  | ×  | ×  | ×  | ×  | ×  |
| 1st | ○  | ×  | ×  | ◎  | ×  | ×  | ×  | ◎  | ○  | ×  | ×  | ○  |
| 2nd | ○  | ×  | ×  | ◎  | ×  | ◎  | ○  | ×  | ○  | ○  | ○  | ×  |
| 3rd | ○  | ×  | ○  | ◎  | ◎  | ×  | △  | ×  | ○  | ○  | ×  | ×  |
| 4th | ○  | ○  | △  | ◎  | ×  | ×  | △  | ×  | ○  | ×  | ×  | ×  |
| 5th | △  | ○  | ○  | ×  | ○  | ×  | △  | ×  | ×  | ×  | ×  | ×  |
| 6th | △  | ○  | ×  | ×  | △  | ○  | △  | ×  | ×  | ×  | ×  | ×  |

○ Engaged
× Disengaged
◎ Engaged during engine braking
△ Engaged with no power transmitted

CONTROL DEVICE FOR VEHICLE

CROSS-REFERENCE TO RELATED APPLICATIONS

This is a national phase application based on the PCT International Patent Application No. PCT/JP2011/074298 filed on Oct. 21, 2011, the entire contents of which are incorporated herein by reference.

TECHNICAL FIELD

The present invention relates in general to control devices for a vehicle including a motor generator as a drive power source for travel, and in particular to, for example, solutions for improved accelerator pedal-based vehicle operability.

BACKGROUND ART

Some conventionally known vehicles rely on a motor generator (operable both as an electric power generator and as an electric motor) for their drive power. Among these vehicles are hybrid cars (hybrid vehicles) and electric cars (electric vehicles) disclosed in Patent Literatures 1 to 3 listed below. For example, a hybrid car has a gasoline, diesel, or other type of internal combustion engine and a motor generator running both on electric power generated by the output of the engine and on electric power stored in a battery (electric storage device) so that the car can travel by relying on either or both of these engine and motor generator for drive power.

In a vehicle equipped with a motor generator as a drive power source, the motor generator may be operated as an electric motor to supply drive power (motoring state) or, during deceleration of the vehicle, as an electric power generator to regenerate electric power which is saved in a battery. Since the battery has a limited storage capacity (the battery is capable of storing a limited quantity of electric power), the state of charge (SOC) of the battery is monitored to prevent overcharging of the battery, and the battery input is restricted (referred to generally as "Win restriction," or maximum charging power restriction) if necessary while the motor generator is generating power.

CITATION LIST

Patent Literatures

[Patent Literature 1] JP 2011-126379A
[Patent Literature 2] JP 2011-88595A
[Patent Literature 3] JP 2010-115059A

SUMMARY OF THE INVENTION

Problems to be Solved by the Invention

If, for example, the vehicle moves backward while the motor generator is operating as an electric motor for forward travel in response to a forward travel request made when the vehicle is traveling uphill or in response to a forward acceleration request made when the vehicle is stationary on an ascending slope, the motor generator rotates backward (for backward travel) while generating a positive torque (forward travel torque). The motor generator operates as an electric power generator in such a situation, with the generated electric power being stored in the battery.

However, if the battery input is restricted (for example, in response to the motor generator generating electric power in excess of the battery's maximum charging power (allowed charging power) Win) while the motor generator is generating power, the motor generator is controlled to restrict its torque. This restriction in turn reduces the controllable range of torque that the driver may manipulate through the accelerator pedal, which in turn forces the driver to frequently use brakes in combination with the accelerator to stop or move the vehicle forward.

The same problems arise if, for example, the vehicle moves forward while the motor generator is responding to a backward travel request made when the vehicle is traveling downhill or responding to a backward acceleration request made when the vehicle is stationary on a descending slope.

Patent Literature 3 discloses combined use of a friction brake and a motor generator to prevent backward travel on an ascending slope. Specifically, when the vehicle starts accelerating from standstill on an ascending slope, the wheels are placed under friction brake torque by the friction brake until the motor generator reaches a predetermined rotational speed. This solution, however, requires the driver to use the friction brake more often.

In view of these problems, it is an object of the present invention to provide a control device for a vehicle including a motor generator as a drive power source, the control device capable of improving accelerator pedal-based vehicle operability by ensuring the torque output of the motor generator while maintaining power generation by the motor generator within an acceptable range.

Solution to Problem

Summary of the Invention

The invention achieves the object as summarized below. If the vehicle moves in a direction (e.g., backward) opposite the direction of travel of the vehicle (e.g., forward) requested by the driver, a clutch, disposed between the motor generator and a wheel, is made to slip to reduce the rotational force transmitted from the wheel to the motor generator, hence lower the rotational speed of the motor generator. This mechanism maintains power generation by the motor generator within an acceptable range, allowing the torque of the motor generator to increase as much as the decrease of the power generation.

Means to Solve Problems

Specifically, the present invention is premised on a control device for a vehicle including a motor generator and a torque capacity-variable engaging/disengaging device disposed on a power transmission path between the motor generator and a wheel. The control device includes control means wherein if the vehicle, moves in a direction opposite a direction of travel of the vehicle when the motor generator is operating as an electric motor that generates a torque for the direction of travel, the control means reduces a torque capacity of the engaging/disengaging device to lower a rotational speed of the motor generator as compared to when the engaging/disengaging device is engaged.

A specific arrangement example of the control means is as follows. If an electric storage device is provided that stores electric power generated by the motor generator, the control means varies the torque capacity of the engaging/disengaging device in accordance with the electric power generated by the motor generator for storage in the electric storage device and with a maximum power storage level of the electric storage device.

When this is actually the case, the control means lowers the torque capacity of the engaging/disengaging device, hence the rotational speed of the motor generator, so that the electric power generated by the motor generator for storage in the electric storage device does not exceed the maximum power storage level of the electric storage device.

These features reduce the torque capacity of the engaging/disengaging device, thereby lowering the rotational force transmitted from the wheel to the motor generator and in turn lowering the rotational speed of the motor generator. The lowering of the rotational speed of the motor generator enables an increase in the torque of the motor generator while restricting the power generation by the motor generator. That allows for improved accelerator pedal-based vehicle operability.

Another solution example is as follows. The solution is premised on a control device for a vehicle including an internal combustion engine, a motor generator, a first torque capacity-variable engaging/disengaging device disposed on a power transmission path between the internal combustion engine and the motor generator, and a second torque capacity-variable engaging/disengaging device disposed on a power transmission path between the motor generator and a wheel. The control device includes control means wherein if the vehicle moves in a direction opposite a direction of travel of the vehicle when the motor generator is operating as an electric motor that generates a torque for the direction of travel, the control means varies a torque capacity of the first engaging/disengaging device in accordance with reduction of a torque capacity of the second engaging/disengaging device.

When this is actually the case, a specific arrangement example of the control means is as follows. If an electric storage device is provided that stores electric power generated by the motor generator, the control means varies the torque capacities of the first and second engaging/disengaging devices in accordance with the electric power generated by the motor generator for storage in the electric storage device and with a maximum power storage level of the electric storage device.

When this is actually the case, the control means varies the torque capacities of the first and second engaging/disengaging devices to lower the rotational speed of the motor generator so that the electric power generated by the motor generator for storage in the electric storage device does not exceed the maximum power storage level of the electric storage device.

These features vary the torque capacities of the first and second engaging/disengaging devices, thereby lowering the torque of the motor generator. That allows for improved accelerator pedal-based vehicle operability by exploiting the torque of the internal combustion engine while maintaining the power generation by the motor generator.

A further solution example is as follows. The solution is premised on a control device for a vehicle including a motor generator and an engaging/disengaging device disposed on a power transmission path between the motor generator and a wheel, the engaging/disengaging device varying a torque capacity thereof to enable internal locking of the power transmission path. The control device includes control means wherein if the vehicle moves in a direction opposite a direction of travel of the vehicle when the motor generator is operating as an electric motor that generates a torque for the direction of travel, the control means increases the torque capacity of the engaging/disengaging device to generate a torque on the wheel for the direction of travel.

When this is actually the case, a specific arrangement example of the control means is as follows. If an electric storage device is provided that stores electric power generated by the motor generator, the control means varies the torque capacity of the engaging/disengaging device in accordance with the electric power generated by the motor generator for storage in the electric storage device and with a maximum power storage level of the electric storage device.

The control means increases the torque capacity of the engaging/disengaging device to generate a torque on the wheel for the direction of travel so that the electric power generated by the motor generator for storage in the electric storage device does not exceed the maximum power storage level of the electric storage device.

These features increase the torque capacity of the engaging/disengaging device and generate a torque on the wheel. That allows for improved accelerator pedal-based vehicle operability while restricting increases in the power generation caused by an increase in the torque of the motor generator.

The control means determines a quantity of heat absorbed by the engaging/disengaging device(s) as a result of the control means having varied the torque capacity/capacities of the engaging/disengaging device(s); and if the quantity of the heat has reached a predetermined value, the control means stops varying the torque capacity/capacities of the engaging/disengaging device(s).

The control means progressively decreases an input torque to the engaging/disengaging device(s) as the quantity of the heat approaches a maximum acceptable value as a result of the control means having varied the torque capacity/capacities of the engaging/disengaging device(s).

These features enable restricting the quantity of heat absorbed by the engaging/disengaging device(s) to a predetermined value or less. That maintains the performance of the engaging/disengaging device(s).

The direction of travel is a forward direction for the vehicle; and if the vehicle moves backward when the vehicle is ascending a slope or when the vehicle starts forward acceleration from standstill on an ascending slope, the control means varies the torque capacity/capacities of the engaging/disengaging device(s).

This feature allows for improved accelerator pedal-based vehicle operability, for example, when the vehicle is traveling forward on an ascending slope or when the vehicle starts forward acceleration from standstill on an ascending slope.

Advantageous Effects of the Invention

The present invention regulates the torque capacity of an engaging/disengaging device disposed on a power transmission path. The regulation allows for improved accelerator pedal-based vehicle operability while maintaining the power generation by the motor generator within an acceptable range.

BRIEF DESCRIPTION OF DRAWINGS

FIG. 3 is a table showing engagement/disengagement of clutches, brakes, and one-way clutches of an automatic transmission for each gear.

DESCRIPTION OF EMBODIMENTS

The following will describe an embodiment of the present invention in reference to drawings. In the present embodiment, the present invention is applied to a hybrid vehicle.

—Basic Structure of Power Train—

Figure 1:
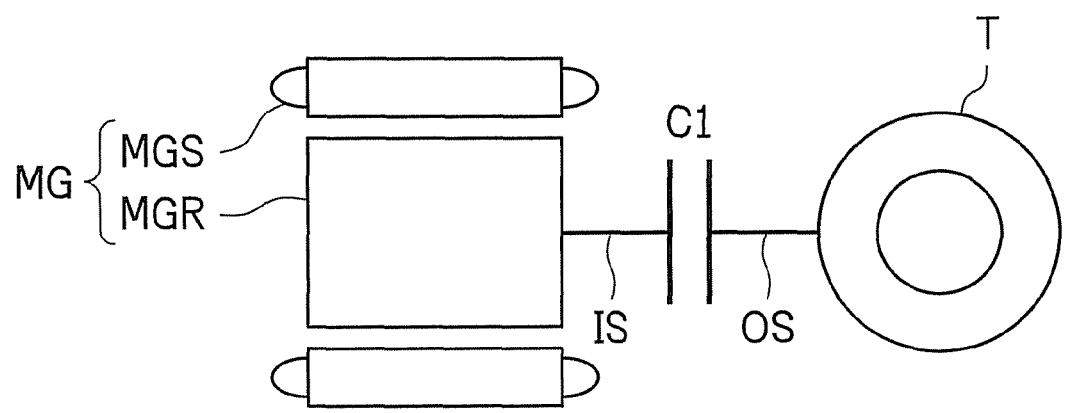
FIG. 1 is a conceptual diagram schematically showing a part, of a power train of a vehicle in accordance with an embodiment, that makes up a power transmission system linking a motor generator to driving wheels.

FIG. 1 is a conceptual diagram schematically showing a part, of a power train of a vehicle in accordance with the present embodiment, that makes up a power transmission system linking a motor generator MG to driving wheels T (FIG. 1 shows a clutch (engaging/disengaging device) C1, which is one of frictional engagement devices in a gear shifting mechanism 30 (described later in detail; see FIG. 2). As illustrated in FIG. 1, the vehicle in accordance with the present embodiment includes a motor generator MG as a drive power source. The motor generator MG is an AC synchronous electric power generator including a rotor MGR made of permanent magnets and a stator MGS around which three-phase windings are provided. The motor generator MG operates both as an electric motor and as an electric power generator.

Figure 4:
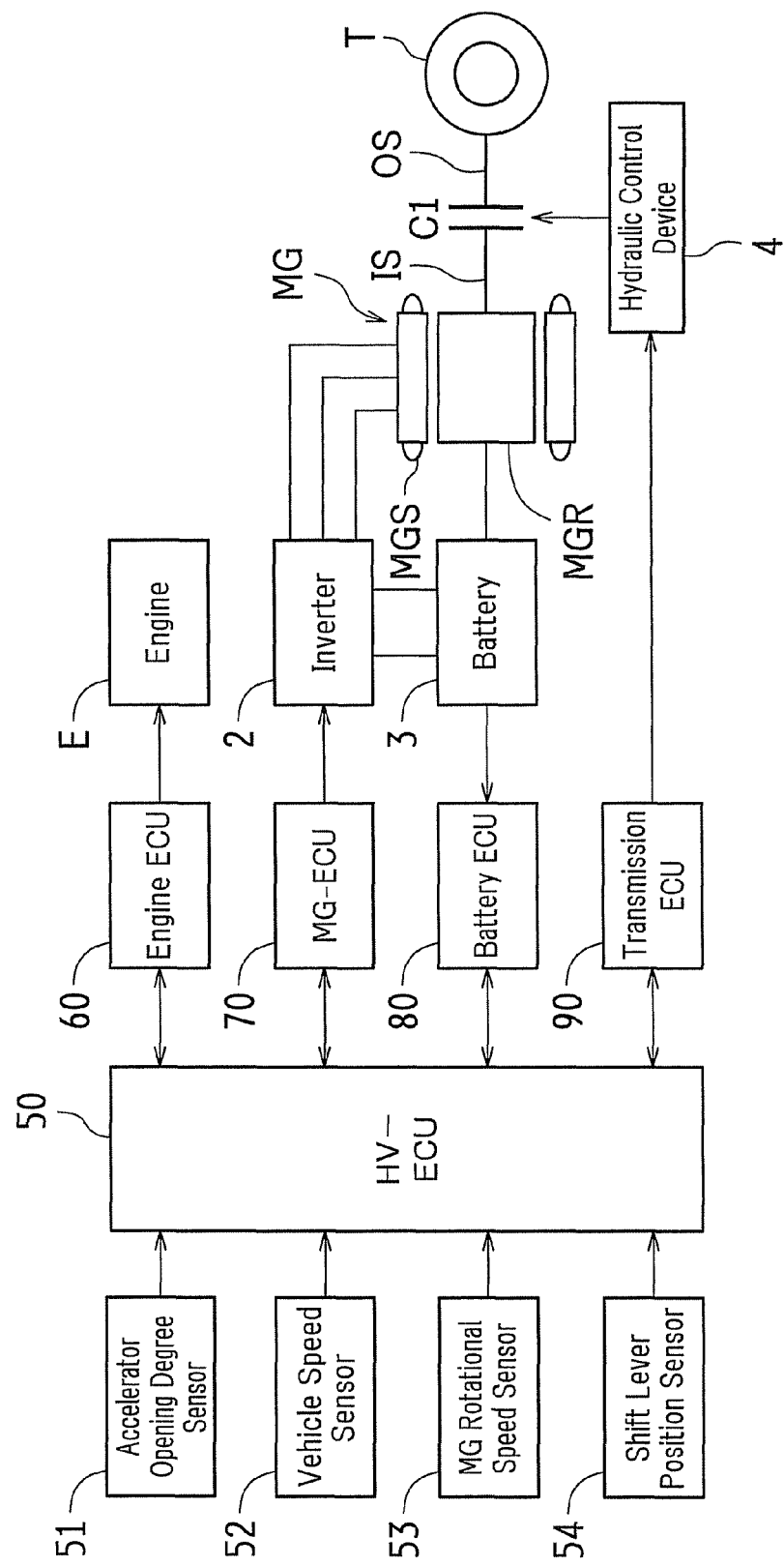
FIG. 4 is a schematic structural diagram of a control block.

The motor generator MG, as illustrated in FIG. 4, is connected to a battery (electric storage device) 3 via an inverter 2. The inverter 2 is controlled by a MG-ECU (motor generator-electronic control unit) 70. Under the control of the inverter 2, the motor generator MG operates either in regenerative mode (regenerative power generation mode) or in motoring mode (engine assist mode). The electric power generated in regenerative mode is stored in the battery 3 via the inverter 2. The electric power that powers the motor generator MG is supplied from the battery 3 via the inverter 2.

As illustrated in FIGS. 1 and 4, the power transmission system includes the clutch C1, which is disposed between an input shaft IS coupled to the rotor MGR of the motor generator MG and an output shaft OS coupled to the driving wheel T. The clutch C1 is a hydraulic type actuated by a hydraulic control device 4 which is in turn under the control of a transmission ECU (transmission electronic control unit) 90. The clutch C1, when disengaged, separates the input shaft IS from the output shaft OS, thereby interrupting power transmission between the rotor MGR of the motor generator MG and the driving wheel T. Meanwhile, when engaged, the clutch C1 allows power transmission between the input shaft IS and the output shaft OS, thereby allowing power transmission between the rotor MGR of the motor generator MG and the driving wheel T. The clutch C1 is capable of operating in semi-engaged state where the clutch C1 has its engaging force (coupling force) regulated by the hydraulic control device 4 which is in turn under the control of the transmission ECU 90. The torque capacity of the clutch C1 is regulated by the transmission ECU 90. The clutch C1 may be an electromagnetic clutch.

—Specific Structure of Power Train—

Next will be described an exemplary specific power train for a hybrid vehicle including the power transmission system shown in FIG. 1.

Figure 2:
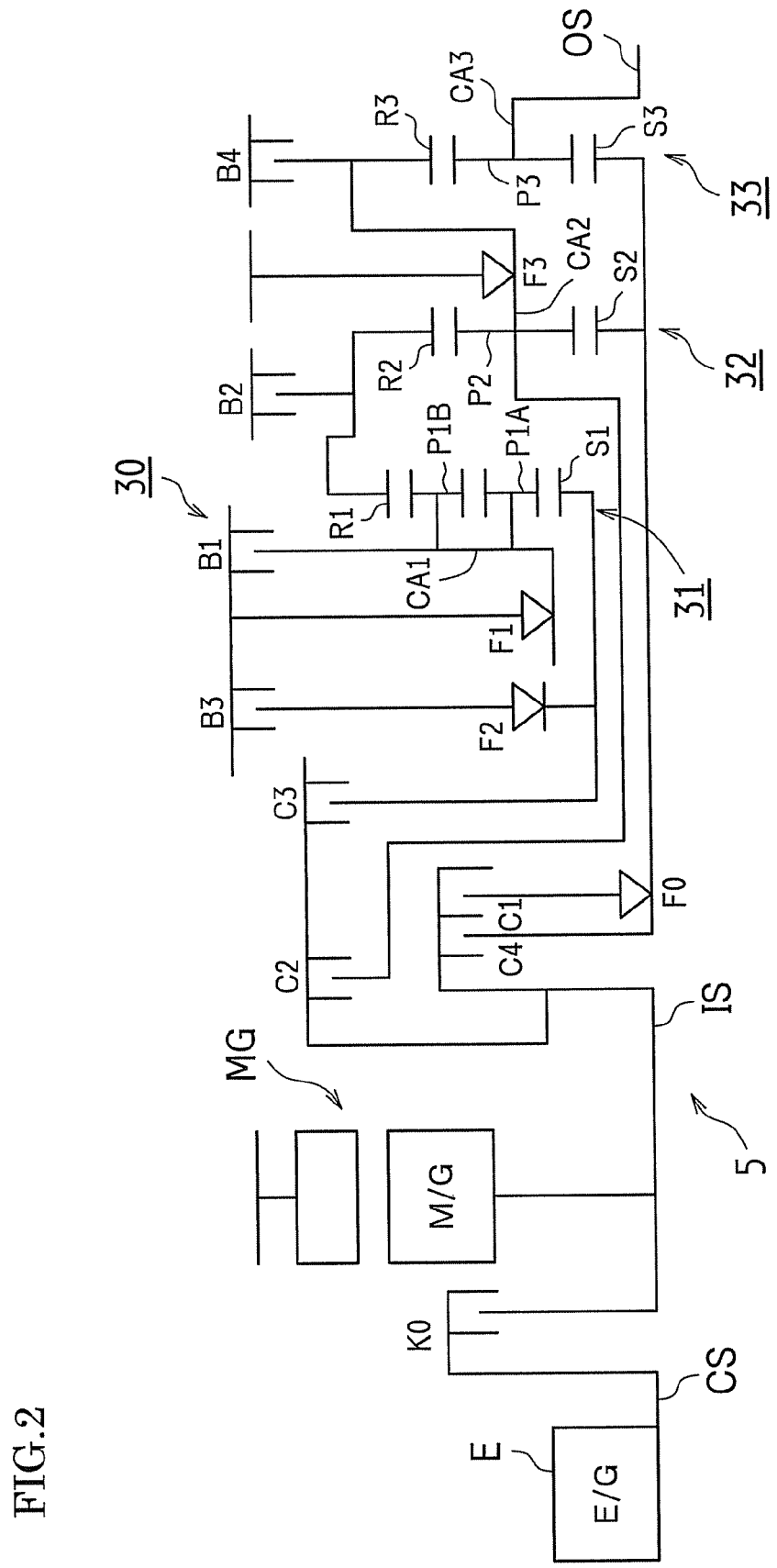
FIG. 2 is a skeleton view showing a specific arrangement of a power train.

FIG. 2 is a skeleton view showing a specific arrangement of the power train. As illustrated in FIG. 2, the power train includes an engine (internal combustion engine) E, the motor generator MG, and an automatic transmission 5.

The engine E may be any publicly known power unit (drive power source) that produces a driving force output from combustion of fuel and be composed of a gasoline, diesel, or like internal combustion engine. If the engine E is, as an example, a gasoline engine, an engine ECU 60 (see FIG. 4) controls a throttle opening degree (intake air quantity) of a throttle valve (not shown) disposed on an intake path, injected fuel quantity, ignition period, and other control parameters.

A clutch K0 is provided between an output shaft CS of the engine E and the input shaft IS. The clutch K0 is a hydraulic clutch actuated by the hydraulic control device 4 which is in turn under the control of the transmission ECU 90. The clutch K0, when disengaged, interrupts power transmission between the engine E and the input shaft IS. When engaged, the clutch K0 allows power transmission between the engine E and the input shaft IS. The clutch K0 may be an electromagnetic clutch.

The automatic transmission 5, provided with the clutch C1, receives via the input shaft IS a rotational force input from the engine E and from the motor generator MG and subjects the rotational force input to the gear shifting mechanism 30 for output to the driving wheel T via the output shaft OS. The automatic transmission 5 is composed primarily of the gear shifting mechanism 30 and the hydraulic control device 4 (see FIG. 4).

The gear shifting mechanism 30 is composed primarily of a first planetary gear set 31, a second planetary gear set 32, a third planetary gear set 33, clutches C1 to C4, brakes B1 to B4, and one-way clutches F0 to F3. The gear shifting mechanism 30 provides six forward gears and one reverse gear.

The first planetary gear set 31 is a double pinion type of gear-based planetary mechanism and includes a sun gear S1, a ring gear R1, inner pinion gears P1A, outer pinion gears P1B, and a carrier CA1.

The sun gear S1 is selectively coupled to the input shaft IS via the clutch C3. The sun gear S1 is selectively coupled to a housing via the one-way clutch F2 and the brake B3 so as not to rotate backward (i.e., direction opposite the rotation of the input shaft IS). The carrier CA1 is selectively coupled to the housing via the brake B1 and the one-way clutch F1 disposed in parallel with the brake B1 so as to be perpetually prevented from rotating backward. The ring gear R1 is integrally coupled to a ring gear R2 of the second planetary gear set 32 and selectively coupled to the housing via the brake B2.

The second planetary gear set 32 is a single pinion type of gear-based planetary mechanism and includes a sun gear S2, the ring gear R2, pinion gears P2, and a carrier CA2.

The sun gear S2 is integrally coupled to a sun gear S3 of the third planetary gear set 33 and selectively coupled to the input shaft IS via the clutch C4. The sun gear S2 is selectively coupled to the input shaft IS via the one-way clutch F0 and the clutch C1 so as not to rotate backward relative to the input shaft IS. The carrier CA2 is integrally coupled to a ring gear R3 of the third planetary gear set 33, selectively coupled to the input shaft IS via the clutch C2, and selectively coupled to the housing via the brake B4. The carrier CA2 is perpetually prevented from rotating backward because of the one-way clutch F3 disposed in parallel with the brake B4.

The third planetary gear set 33 is a single pinion type of gear-based planetary mechanism and includes the sun gear S3, the ring gear R3, pinion gears P3, and a carrier CA3. The carrier CA3 is integrally coupled to the output shaft OS.

The clutches C1 to C4 and brakes B1 to B4 are composed of a wet multi-disc frictional engagement device that works by means of oil viscosity.

The hydraulic control device 4 engages and disengages the individual clutches C1 to C4 and brakes B1 to B4 of the gear shifting mechanism 30 to form a suitable gear (first to sixth forward and reverse gear). The basic structure of the hydraulic control device 4 is publicly known, and no more description is given here about its details in text or drawings.

Next will be described conditions under which the gear shifting mechanism 30 forms each gear in reference to FIG. 3.

FIG. 3 is a table showing engagement and disengagement of the clutches C1 to C4, brakes B1 to B4, and one-way clutches F0 to F3 of the gear shifting mechanism 30 for each gear. In this table, a circle indicates engagement, a cross disengagement, a double circle engagement during engine braking, and a triangle engagement with no power being transmitted.

The clutch C1, referred to here as the forward clutch (input clutch), is used (engaged) to form one of forward gears (gears excluding the parking (P), reverse (R), and neutral (N) positions) as shown in the table of FIG. 3.

In this power train, the clutch C1 in the table corresponds to the clutch C1 in FIG. 1. In other words, in typical control, the clutch C1 is engaged to transmit the driving force from the motor generator MG and the driving force from the engine E toward the driving wheel T, for example, when the vehicle starts forward acceleration from standstill and when the vehicle is traveling forward.

—Control Block—

FIG. 4 is a schematic structural diagram of a control block of a hybrid vehicle. As illustrated in FIG. 4, the control system for the hybrid vehicle includes a HV-ECU (hybrid vehicle-electronic control unit) 50, the engine ECU 60, the MG-ECU 70, a battery ECU 80, and the transmission ECU 90. Each ECU 50 to 90 is composed primarily of a microcomputer including a CPU (central processing unit) and a memory, such as a ROM (read-only memory) and a RAM (random access memory). The basic functions of each ECU 50 to 90 will be briefly described next.

The HV-ECU 50 is a control device that controls the engine E and the motor generator MG to generate a vehicle-driving force as requested by the driver while the hybrid vehicle is traveling. Apart from the control of vehicle-driving force, the HV-ECU 50 also controls the charging/discharging of the battery 3 and the operation of the automatic transmission 5.

Specifically, the HV-ECU 50 receives, for example, an accelerator opening degree signal from an accelerator opening degree sensor 51, a vehicle speed signal from a vehicle speed sensor 52, a MG rotational speed signal from a MG rotational speed sensor 53, and a shift lever position signal from a shift lever position sensor 54 detecting the position of a shift lever (not shown). The HV-ECU 50 also receives a signal indicating the state of charge SOC of the battery 3 and a signal indicating the temperature of the battery 3 from the battery ECU 80. The HV-ECU 50 then generates control instruction signals required to drive the motor generator MG, the engine E, and the automatic transmission 5 based on these signals and supplies them to the engine ECU 60, the MG-ECU 70, and the transmission ECU 90. Specifically, the HV-ECU 50 determines output sharing between the engine E and the motor generator MG so that the hybrid vehicle can travel most efficiently, generates control instruction signals so that the engine E and the motor generator MG can output drive power in accordance with the output sharing, and supplies them to the engine ECU 60, the MG-ECU 70, and the transmission ECU 90.

The engine ECU 60 is a control device that controls the engine E in response to control instructions from the HV-ECU 50. Specifically, the engine ECU 60 receives control instructions required to drive the engine E from the HV-ECU 50, generates control signals related to control parameters of the engine E, including injected fuel quantity, ignition period, and intake air quantity, and supplies them to actuators of the engine E.

The MG-ECU 70 is a control device that controls the inverter 2 and the motor generator MG in response to control instructions from the HV-ECU 50. Specifically, the MG-ECU 70 receives control instructions required to drive the motor generator MG from the HV-ECU 50. The MG-ECU 70 then generates control signals to drive the inverter 2 and supplies them to the inverter 2.

The battery ECU 80 is a control device primarily controlling the state-of-charge management and abnormality detection for the battery 3. Specifically, the battery ECU 80 acquires temperature information of the battery 3 (e.g., from a sensor signal from a battery temperature sensor (not shown)) and calculates the state of charge SOC of the battery on the basis of an electric current Ib and voltage Vb related to the charging or discharging of the battery 3. The state of charge SOC indicates how much charge the battery 3 has stored (charging level), or how much charge the battery 3 is holding (residual charge level), relative to the state of full charge of the battery 3. The state of charge SOC is expressed, for example, by the ratio of the current charging level to the full charge capacity (0 to 100%).

The battery 3 is a chargeable/dischargeable DC power source and composed of, for example, a nickel-hydrogen, lithium-ion, or like secondary battery. The battery 3 supplies DC power to the inverter 2. The battery 3 is charged by, for example, the electric power generated from the output of the engine E by the motor generator MG and the regenerative electric power generated during vehicle deceleration by the motor generator MG. The battery 3 may be replaced with a capacitor with large capacitance.

Figure 5:
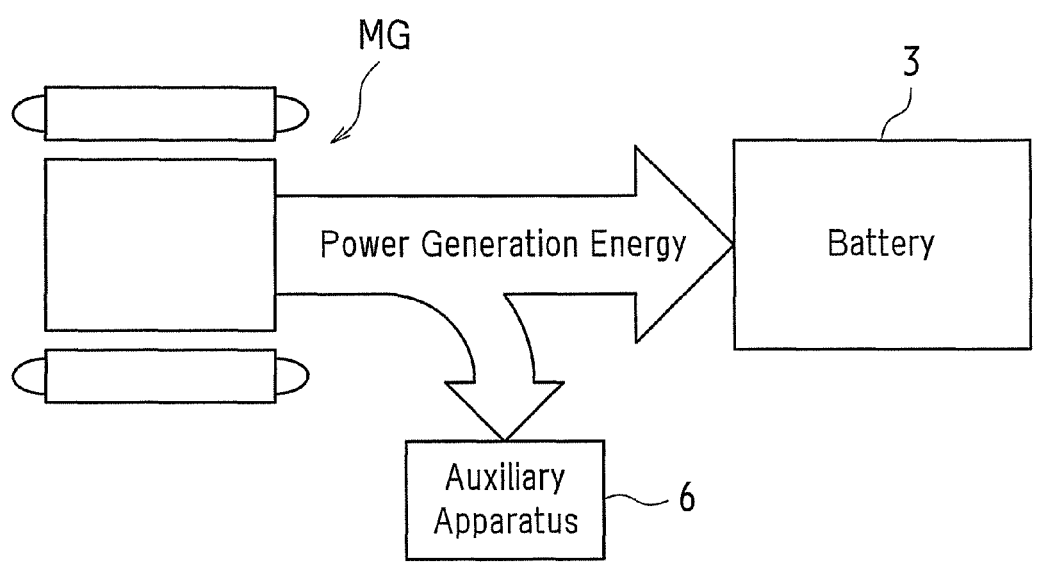
FIG. 5 is a schematic view showing flows of generated electric energy that originate at a motor generator.

The electric power generated by the motor generator MG is not only stored in the battery 3, but when auxiliary apparatus 6 (see FIG. 5) is in operation, supplied to the auxiliary apparatus 6 where it is consumed. FIG. 5 is a schematic view showing flows of generated electric energy that originate at the motor generator MG. As illustrated in FIG. 5, most of the electric power (electric energy) generated by the motor generator MG is stored in the battery 3. When the auxiliary apparatus 6, such as air conditioners, defrosters, and electric pumps (electric oil pump, electric water pump, etc.), is being powered, part of the generated electric power is supplied to the auxiliary apparatus 6.

The inverter 2 receives DC voltage from the battery 3, converts the DC voltage to AC voltage, and supplies the AC voltage to the motor generator MG. The inverter 2 also converts the AC voltage generated by the motor generator MG to DC voltage to charge the battery 3.

The battery 3 has a limited storage capacity (the battery 3 is capable of storing a limited quantity of electric power; "maximum power storage level") and a limited dischargeable power level (the battery 3 is capable of discharging a limited quantity of electric power). Both the maximum charging power Win and the maximum discharging power Wout of the battery 3 change with the temperature Tb, the state of charge SOC, and other conditions of the battery 3.

Figure 6:
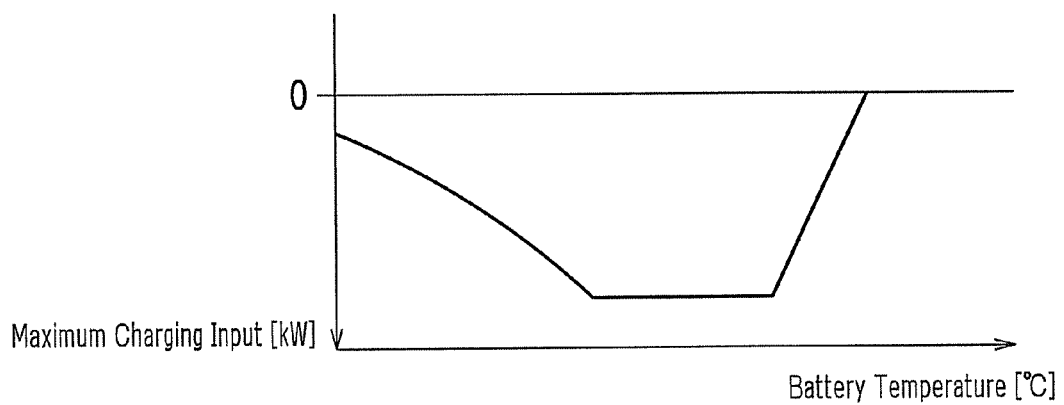
FIG. 6 is a graph representing a relationship between battery temperature and a maximum charging power (the battery's maximum charging input).

FIG. 6 is a Win map representing a relationship between the temperature of the battery 3 and the maximum charging power (maximum charging input). As illustrated in FIG. 6, according to the Win map, when the battery temperature is within a predetermined range, the maximum charging input is constant; when the battery temperature is below a predetermined value, the maximum charging input/discharging output decreases with a decrease in the battery temperature; when the battery temperature is above a predetermined value, the maximum charging input/discharging output decreases with an increase in the battery temperature. The Win is set to a value in excess of a limit value (e.g., maximum battery voltage) when, for example, input/output is continued for a predetermined period (e.g., "A" seconds or longer).

Figure 7:
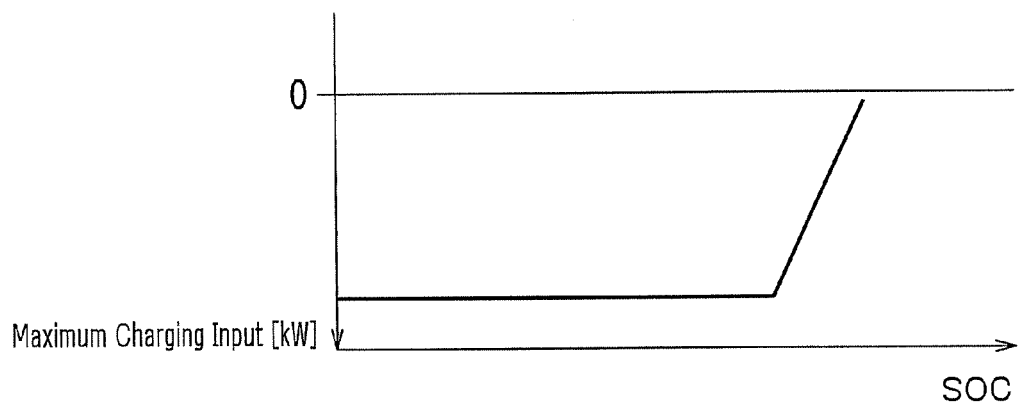
FIG. 7 is a graph representing a relationship between a SOC and a maximum charging power (the battery's maximum charging input).

FIG. 7 is a Win map representing a relationship between the SOC and the maximum charging power (maximum charging input). As illustrated in FIG. 7, according to the Win map, when the SOC is relatively low, the maximum charging input/discharging output is constant at a relatively high value; when the SOC is in excess of a predetermined value, the maximum charging input/discharging output decreases with an increase in the SOC.

The transmission ECU 90 is a control device that controls the hydraulic control device 4 in response to control instructions from the HV-ECU 50. Specifically, the transmission ECU 90 controls the hydraulic control device 4 to engage and disengage the individual clutches C1 to C4 and brakes B1 to B4 of the gear shifting mechanism 30 to form a suitable gear (first to sixth forward and reverse gear). If the vehicle moves backward despite a forward acceleration request made when the vehicle is stationary on an ascending slope, the transmission ECU 90 controls the hydraulic control device 4 in such a manner as to regulate the quantity of slippage of the clutch C1 ("clutch control").

—Clutch Control—

Next will be described clutch control, which is a feature of the present embodiment. The clutch control controls the torque capacity (quantity of slippage) of the clutch C1 and is implemented to reduce backward travel of the vehicle. The following description will focus on the clutch control as it is implemented in response to a forward acceleration request that is made when the vehicle is stationary on an ascending slope (e.g., in response to the driver depressing the accelerator pedal with the shift lever in D position).

First, the clutch control is outlined. If the vehicle moves backward while the motor generator MG is operating as an electric motor to generate forward (direction of travel of the vehicle) acceleration from standstill in response to a forward acceleration request made when the vehicle is stationary on an ascending slope, the motor generator MG rotates backward (for backward travel) while generating a positive torque (forward travel torque). The motor generator MG is forced to operate as an electric power generator in such a situation, with the generated electric power being stored in the battery 3. If the input to the battery 3 is restricted (for example, in response to the motor generator MG generating electric power in excess of the maximum charging power (allowed charging power) Win of the battery 3) while the motor generator MG is generating power, the motor generator MG is controlled to restrict its torque. This restriction may result in a torque that is insufficient for forward acceleration from standstill on an ascending slope.

In the clutch control of the present embodiment, the clutch C1 is made to slip (the torque capacity of the clutch C1 is reduced) in such a situation. That reduces the rotational force transmitted from the driving wheel T to the motor generator MG via the clutch C1 (rotational force for backward travel), hence lowers the rotational speed of the rotor MGR of the motor generator MG (lowers the rotational speed for backward travel). In this manner, the clutch control restricts power generation by the motor generator MG (the control means lowers the rotational speed of the motor generator MG). This restriction on power generation by the motor generator MG enables an increase in the torque of the motor generator MG (the lowering of the rotational speed of the rotor MGR leads to the lowering of power generation, which in turn enables an increase in the torque of the motor generator MG) within a range in which the input to the battery 3 is not restricted (no Win restriction is carried out). The clutch control thus enables maintaining performance during acceleration from standstill and improving performance in restricting backward travel. In other words, the clutch control enables maintaining performance during acceleration from standstill and improving performance in restricting backward travel, by increasing the torque of the motor generator MG while maintaining the same level of power generation by the motor generator MG (the same level of power generation within an acceptable range).

Figure 8:
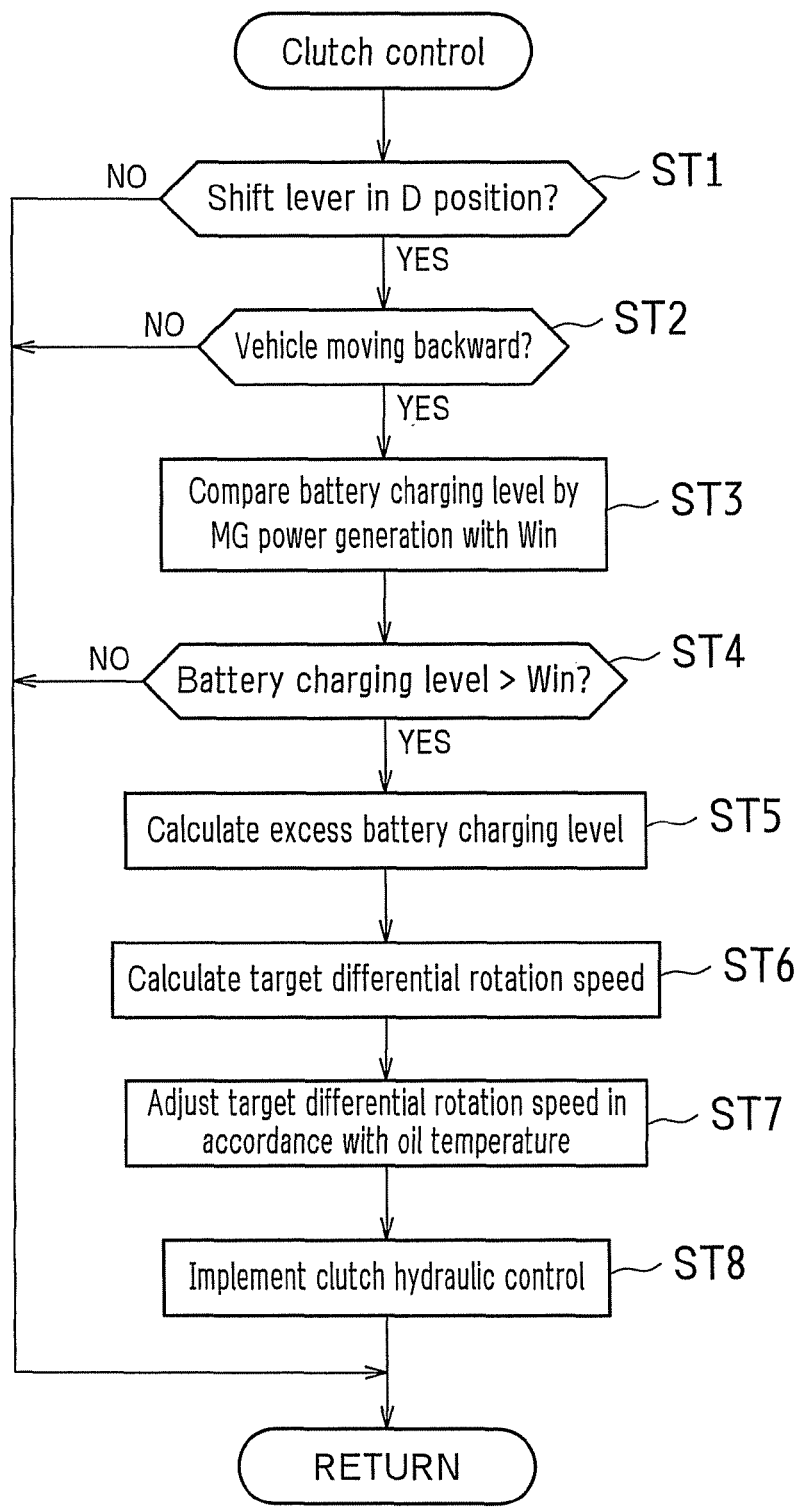
FIG. 8 is a flow chart depicting a clutch control process.

Next, the clutch control is described more specifically. FIG. 8 is a flow chart depicting a clutch control process. The clutch control is implemented every few microseconds after the start-up of the hybrid system.

First, in step ST1, it is determined from the shift lever position signal from the shift lever position sensor 54 whether or not the shift lever is in D position.

If the shift lever is not in D position (NO in step ST1), it is determined that no acceleration-from-standstill request has been made by the driver. The process returns without implementing the clutch control (in which the torque capacity of the clutch C1 is reduced).

If the shift lever is in D position (YES in step ST1), the process proceeds to step ST2 where it is determined from the MG rotational speed signal from the MG rotational speed sensor 53 whether or not the vehicle is moving backward. A wheel speed sensor may be provided to determine from an output signal of the wheel speed sensor whether or not the vehicle is moving backward.

If the vehicle is not moving backward, that is, if the vehicle is stationary or moving forward (NO in step ST2), the process returns without implementing the clutch control because there is no power generation by the motor generator MG caused by backward travel of the vehicle.

If the vehicle is moving backward (YES in step ST2), the process proceeds to step ST3 where the charging level of the battery 3 that is attributable to power generation by the motor generator MG caused by backward travel of the vehicle is compared with the maximum charging power (allowed charging power) Win of the battery 3, or in other words, it is determined whether or not the charging level of the battery 3 that is attributable to power generation by the motor generator MG exceeds the maximum charging power Win of the battery 3. The maximum charging power Win used here is determined from the Win maps detailed above (see FIGS. 6 and 7). If the auxiliary apparatus 6 is in operation at the time of the determination, the auxiliary apparatus 6 consumes part of the electric power generated by the motor generator MG (see FIG. 5), and the charging level of the battery 3 decreases as much as the consumption. In other words, the calculated charging level of the battery 3 equals the quantity of the electric power generated by the motor generator MG minus the quantity of the electric power consumed by the auxiliary apparatus 6 currently in operation. The calculated charging level of the battery 3 is compared with the maximum charging power Win of the battery 3. The charging level of the battery 3 decreases by as much as the power consumption by the auxiliary apparatus 6.

Thereafter, the process proceeds to step ST4 where it is determined whether or not the charging level of the battery 3 is in excess of the maximum charging power Win of the battery 3.

If the charging level of the battery 3 is not in excess of the maximum charging power Win of the battery 3 (NO in step ST4), the process returns because the input to the battery 3 does not need to be restricted, and neither does the torque of the motor generator MG. In this situation, a sufficient level of torque is generated by the motor generator MG.

On the other hand, if the charging level of the battery 3 is in excess of the maximum charging power Win of the battery 3 (YES in step ST4), the process proceeds to step ST5 where the excess quantity (by how much the charging level of the battery 3 is exceeded) is calculated.

Thereafter, the process proceeds to step ST6 where a target differential rotation speed (a target variation value of the rotational speed of the motor generator MG relative to the rotational speed of the output shaft OS) is calculated to lower the rotational speed of the motor generator MG as much as a value that corresponds to the calculated excess quantity. The calculation is carried out by, for example, dividing the excess quantity of the charging level of the battery 3 by the current torque of the motor generator MG (the torque generated in response to a torque instruction value). Alternatively, the target differential rotation speed may be determined from a target differential rotation speed map prepared in advance by experiment or simulation. The target differential rotation speed determined here increases with an increase in the excess quantity (by how much the charging level of the battery 3 is exceeded) calculated previously in step ST5. Since the (calculated) charging level of the battery 3 decreases with an increase in the power consumption by the auxiliary apparatus 6 in step ST3 as mentioned above, the calculated target differential rotation speed decreases with an increase in the power consumption by the auxiliary apparatus 6.

After the target differential rotation speed is calculated as above, the process proceeds to step ST7 where the target differential rotation speed is adjusted according to the temperature of the hydraulic oil in the hydraulic control device 4. The adjusted target differential rotation speed increases with a decrease in the temperature of the hydraulic oil. If the temperature of the hydraulic oil is low, the clutch C1 responds slowly, and the target differential rotation speed may not be achieved as quickly as it should be. This potential inconvenience is accommodated by adjusting the target differential rotation speed in such a manner as to increase the adjusted target differential rotation speed with a decrease in the temperature of the hydraulic oil. A final target differential rotation speed may be determined from an adjustment map prepared in advance by experiment or simulation or may be calculated using a predetermined computation formula. An adjustment map is a map that specifies a relationship between the temperature of the hydraulic oil and the magnitude of adjustment of the target differential rotation speed.

After the final target differential rotation speed is determined as above, the process proceeds to step ST8 where a clutch hydraulic pressure is determined at which the final target differential rotation speed is achieved, and the hydraulic control device 4 is controlled to achieve that clutch hydraulic pressure. The clutch hydraulic pressure may be determined from a hydraulic pressure setting map prepared in advance by experiment or simulation or may be calculated using a predetermined computation formula. A hydraulic pressure setting map is a map that specifies a relationship between the clutch hydraulic pressure and the target differential rotation speed of the clutch C1.

The process detailed above is repeated if the charging level of the battery 3 that is attributable to power generation by the motor generator MG exceeds the maximum charging power Win of the battery 3 when the vehicle is moving backward. The repetition of the process makes the clutch C1 slip to lower the rotational speed of the motor generator MG, which in turn restricts the power generation by the motor generator MG. The restriction then enables an increase in the torque of the motor generator MG within a range in which the input to the battery 3 is not restricted. That allows for improved accelerator pedal-based vehicle operability.

Figure 9:
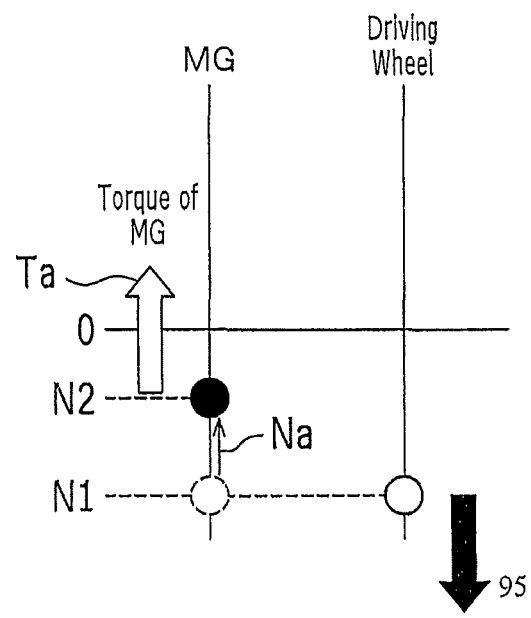
FIG. 9 is a collinear graph representing changes in the rotational speed of a motor generator in clutch control.

FIG. 9 is a collinear graph representing the rotational speed of the driving wheel T and changes in the rotational speed of the motor generator MG when the clutch control is implemented. A rotational speed N1 in FIG. 9 represents the rotational speeds of the driving wheel T and the motor generator MG when the vehicle is moving backward (speed increasing in a negative direction as indicated by arrow 95), but the clutch control is not implemented (the clutch C1 is engaged). For ease of understanding, FIG. 9 assumes that there is provided no gear shifting mechanism between the motor generator MG and the driving wheel T.

When the vehicle is moving backward as mentioned above, if the charging level of the battery 3 that is attributable to power generation by the motor generator MG exceeds the maximum charging power Win of the battery 3, and the clutch control is implemented (the clutch C1 is made to slip), the rotational force transmitted from the driving wheel T to the motor generator MG decreases, and the (backward) rotational speed of the motor generator MG decreases with this decrease of the rotational force. FIG. 9 shows the rotational speed of the driving wheel T at N1 and the rotational speed of the motor generator MG at N2 (the rotational speed is approaching 0; see arrow Na in FIG. 9). With the rotational speed of the motor generator MG decreasing in this manner, the power generation by the motor generator MG also decreases, and the (forward) torque of the motor generator MG can be increased within a range in which the input to the battery 3 is not restricted (see arrow Ta in FIG. 9). That ensures accelerator pedal-based operability.

Figure 10:
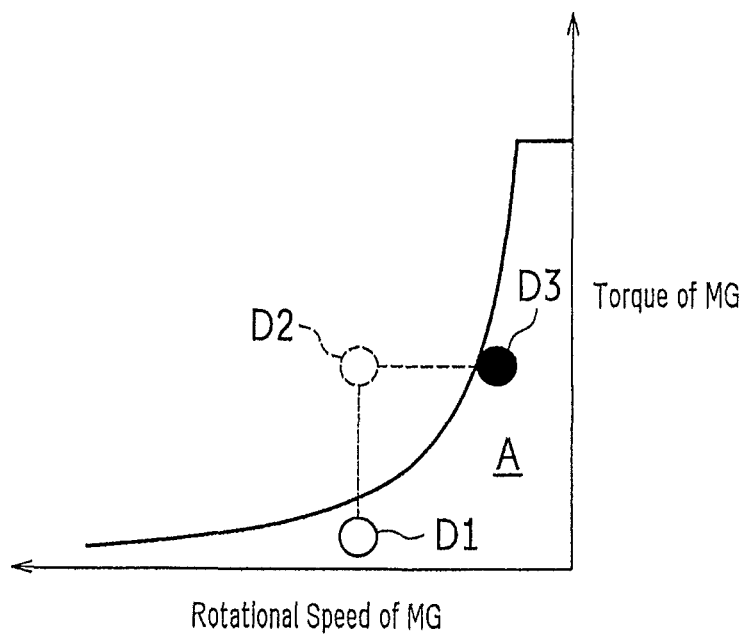
FIG. 10 is a graph representing exemplary changes of the operating point of a motor generator in clutch control.

FIG. 10 is a graph representing changes of the operating point (rotational speed and torque) of the motor generator MG in the current context. Region A in FIG. 10 (hereinafter, "the motor generator operating region A") represents the range of operating points of the motor generator MG at which the input to the battery 3 is not restricted. In other words, if the motor generator MG operates inside the motor generator operating region A (the rotational speed and torque of the motor generator MG are controlled to be contained in the motor generator operating region A), the input to the battery 3 is not restricted; if the motor generator MG operates outside the motor generator operating region A, the power generation by the motor generator MG exceeds the maximum charging power Win of the battery 3, and the input to the battery 3 is restricted. The motor generator operating region A expands with an increase in the maximum charging power Win of the battery 3.

For example, if the operating point moves from D1 to D2 in FIG. 10 as a result of depressing the accelerator pedal when the vehicle is moving backward, the power generation by the motor generator MG caused by the backward travel of the vehicle (the charging level of the battery 3) goes beyond the motor generator operating region A, and the input to the battery 3 is restricted. Implementing the clutch control detailed above in this situation lowers the rotational speed of the motor generator MG. As a result, if the operating point reaches D3, as an example, the motor generator MG can operate with no restriction being imposed on the input to the battery 3. That ensures accelerator pedal-based operability.

Figure 11:
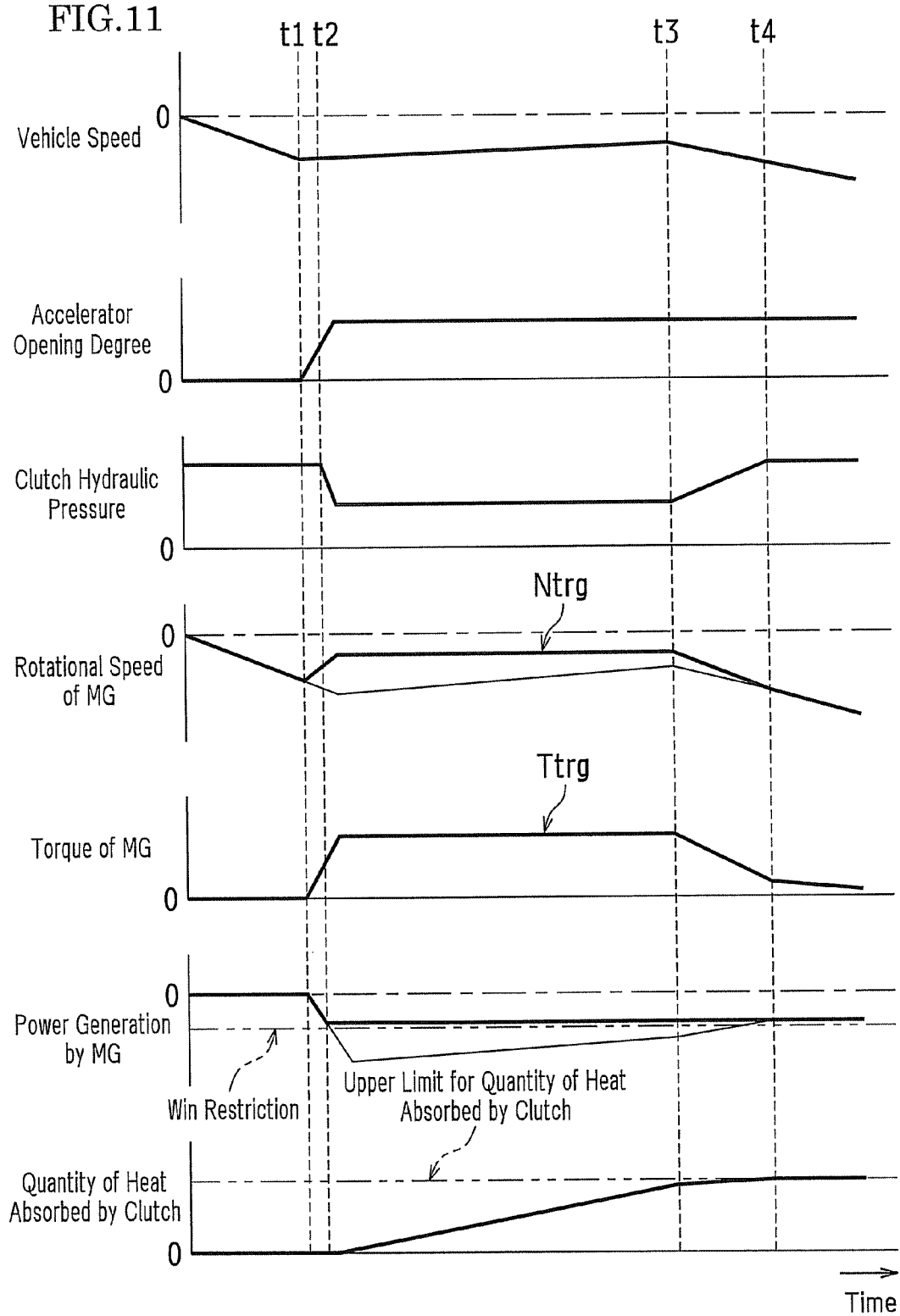
FIG. 11 is a timing chart representing exemplary changes, during clutch control, in vehicle speed, accelerator opening degree, clutch hydraulic pressure, motor generator rotational speed, motor generator torque, motor generator power generation, and quantity of heat absorbed by a clutch.

FIG. 11 is a timing chart representing exemplary changes in vehicle speed, accelerator opening degree, clutch hydraulic pressure, motor generator rotational speed, motor generator torque, motor generator power generation, and quantity of heat absorbed by a clutch when the clutch control is implemented. In FIG. 11, changes are indicated by solid bold lines if they occur when the clutch control in accordance with the present embodiment is being implemented and by thin lines if they occur when the clutch control is not being implemented.

First, if the driver depresses the accelerator pedal to send a forward acceleration request when the vehicle is moving backward (the accelerator pedal starts being depressed at time t1 in FIG. 11), the torque of the motor generator MG (forward direction torque) starts increasing in response to the depression of the accelerator pedal, but the motor generator MG is still rotating in a direction for backward travel because of the backward travel of the vehicle. Thus, the motor generator MG starts generating electric power. At time t1, the speed of the vehicle (which is moving backward) decreases with the increasing torque of the motor generator MG.

At time t2 in FIG. 11, the power generation by the motor generator MG is determined to exceed the maximum charging power Win of the battery 3, and the clutch control is started, or the clutch hydraulic pressure is decreased, and the clutch C1 is made to slip. The drop of the clutch hydraulic pressure is determined through the calculation of the target differential rotation speed (step ST6 of the flow chart) and the adjustment of the target differential rotation speed in accordance with oil temperature (step ST7 of the flow chart).

The implementation of the clutch control lowers the backward rotational speed of the motor generator MG, which maintains the power generation by the motor generator MG within the Win restriction range. That enables an increase in the torque of the motor generator MG (for example, up to a requested torque in accordance with the depression of the accelerator pedal). According to the clutch control in FIG. 11, the rotational speed of the motor generator MG is set to Ntrg in FIG. 11, and the torque of the motor generator MG is set to Ttrg in FIG. 11. These settings enable the power generation by the motor generator MG to be maintained within the Win restriction range. This control is continued to progressively lower the backward velocity pf the vehicle.

Meanwhile, with the clutch control being continuously implemented, the slippage of the clutch C1 generates an increasing quantity of heat that is absorbed by the clutch C1. In other words, the clutch C1 absorbs an increasing quantity of heat as the clutch control is continued. To maintain the performance of the clutch C1, an upper limit is specified for this quantity of heat absorbed by the clutch C1. As the quantity of heat absorbed by the clutch C1 approaches the upper limit, the clutch control is suspended (at time t3 in FIG. 11) to stop the heat generation by the slippage of the clutch C1.

The suspension of the clutch control increases the controlled hydraulic pressure for the clutch C1, allowing the clutch C1 to engage. The engagement results in an increase in the rotational speed of the motor generator MG. To maintain the power generation by the motor generator MG within the Win restriction range, the torque of the motor generator MG is reduced. Thus, the quantity of heat absorbed by the clutch C1 is restricted to a level below or equal to the upper limit. At time t4 in FIG. 11, the clutch C1 completely engages, and the clutch control is terminated.

As described above, according to the present embodiment, if the charging level of the battery 3 that is attributable to power generation by the motor generator MG exceeds the maximum charging power Win of the battery 3 when the vehicle is moving backward, the clutch C1 is made to slip to lower the rotational speed of the motor generator MG, hence to restrict the power generation by the motor generator MG, so that the torque of the motor generator MG can be increased within a range in which the input to the battery 3 is not restricted. That allows for improved accelerator pedal-based vehicle operability.

Variation Example 1

Next, variation example 1 will be described. In variation example 1, in addition to the arrangement of the foregoing embodiment (in which the clutch C1 is disposed between the motor generator MG and the driving wheel T), another clutch (hereinafter, a "first clutch") is disposed on a power transmission path between the engine E and the motor generator MG to enable control of the torque capacities of these clutches.

Specifically, as mentioned above, if the clutch C1 (hereinafter, the "second clutch"), disposed between the motor generator MG and the driving wheel T, is made to slip, the quantity of slippage is restricted by the quantity of heat absorbed by the clutch (second engaging/disengaging device) C1. When that actually happens, since the rotational speed of the motor generator MG cannot be sufficiently lowered, the torque of the motor generator MG must be reduced if the power generation by the motor generator MG within the Win restriction range is to be maintained. That may result in insufficient acceleration when the vehicle is stationary.

This variation example addresses this problem by, when the quantity of slippage of the second clutch C1 is restricted, controlling the first clutch (first engaging/disengaging device) in such a manner as to transmit the torque of the engine E toward the driving wheel T. This control ensures accelerator pedal-based operability.

Specifically, the (restricted) torque of the motor generator MG achieved when the quantity of slippage of the second clutch C1 is restricted is calculated. This torque of the motor generator MG is subtracted from a request torque to calculate a torque shortage. The torque capacity of the first clutch is calculated so that the torque of the engine E can compensate for the torque shortage. The hydraulic pressure for the first clutch is controlled to obtain that torque capacity.

This control enables an increase in the torque by exploiting the torque of the engine E while maintaining the power generation by the motor generator MG so that the power generation does not exceed the maximum charging power Win of the battery 3, which in turn allows for improved accelerator pedal-based vehicle operability.

More specifically, if the charging level of the battery 3 that is attributable to backward travel of the vehicle exceeds the maximum charging power Win of the battery 3, it is determined whether or not the differential rotation speed, used to maintain the charging level of the battery 3 below the maximum charging power Win of the battery 3, can be achieved only by the control of the second clutch C1 (in which only the second clutch C1 is made to slip). If the control of the second clutch C1 alone can maintain the charging level of the battery 3 below the maximum charging power Win of the battery 3, the torque capacity of the second clutch C1 is controlled as in the previous embodiment, without making the first clutch to slip. That allows for improved accelerator pedal-based vehicle operability.

On the other hand, if it is determined that the control of the second clutch C1 alone cannot maintain the charging level of the battery 3 below the maximum charging power Win of the battery 3 because of, for example, the restriction on the quantity of heat absorbed by the clutch C1, the first clutch is made to slip while maintaining the quantity of slippage of the clutch C1 within an acceptable range. When this is the case, the shortage for the request torque (shortage of the torque of the motor generator MG) is calculated. The torque capacity of the first clutch is determined so as to obtain a torque capacity corresponding to the shortage. The torque of the engine E is then determined based on the torque capacity.

According to this variation example, if the engaging force of the first clutch is increased (i.e., if the torque capacity of the first clutch is increased) while the engine E is operating, the rotational speed of the engine may decrease, and its vibration may reach the resonant frequency of the engine E. Therefore, to reduce occurrence of resonance-induced vibration, the differential rotation of the first clutch may be controlled or the engine E may be controlled to generate a high torque.

The torque of the motor generator MG may also be reduced by exploiting the internal friction of the engine E if the engaging force of the first clutch is increased (i.e., if the torque capacity of the first clutch is increased) while the engine E is not operating. In such a situation, the increased engaging force of the first clutch leads to increases in the backward rotational speed of the engine E. Since the engine E is generally restricted in terms of its backward rotational speed, the differential rotation of the first clutch is controlled so as to maintain the backward rotational speed within the restricted rotational speed range.

Furthermore, in this variation example, the target differential rotation speed for the first clutch is adjusted again according to the temperature of the hydraulic oil. Specifically, the target differential rotation speed is adjusted to decrease with a decrease in the temperature of the hydraulic oil. If the temperature of the hydraulic oil is low, the response of the first clutch may become so poor that a sufficient torque cannot be transmitted from the engine E to the driving wheel T. This potential problem is addressed by adjusting the target differential rotation speed so that it decreases with a decrease in the temperature of the hydraulic oil as above. Hence, even if the response of the first clutch is poor, a sufficient torque can be transmitted to the driving wheel T. This adjustment of the target differential rotation speed may be carried out by determining a final target differential rotation speed from an adjustment map prepared in advance by experiment or simulation or may be calculated using a predetermined computation formula. An adjustment map is a map that specifies a relationship between the temperature of the hydraulic oil and the magnitude of adjustment of the target differential rotation speed.

Variation Example 2

Next, variation example 2 will be described. In variation example 2, in addition to the arrangement of the foregoing embodiment (in which the clutch C1 is disposed between the motor generator MG and the driving wheel T), an internal locking-enabled clutch or brake is disposed between the motor generator MG and the driving wheel T. A gear shifting mechanism including brakes B1 and B2, like those disclosed in, for example, JP 2010-269632A and JP 2010-274705A, is used. The (disengaged) brake B1 is made to slip (i.e., the brake B1 is activated to increase a torque capacity) with the brake B2 being kept engaged, to transmit forward-moving torque to the driving wheel T.

According to this variation example, the (disengaged) brake B1 is made to slip to transmit forward-moving torque to the driving wheel T. This enables lowering the torque of the motor generator MG, hence to restrict the power generation by the motor generator MG. That allows for improved accelerator pedal-based vehicle operability while maintaining the power generation by the motor generator MG within the Win restriction range.

According to this variation example, when the (disengaged) brake B1 is made to slip, the torque capacity is regulated to achieve such a power generation by the motor generator MG that the charging level of the battery 3 remains within the Win restriction range.

The torque capacity of the brake B1 is regulated according to the rotational speed of the motor generator MG. Specifically, the torque capacity of the brake B1 is reduced as the rotational speed of the motor generator MG approaches a predetermined, relatively low value; if the rotational speed of the motor generator MG exceeds the predetermined, relatively high value, the torque capacity of the brake B1 is reduced to 0 (disengagement). This regulation of the torque capacity of the brake B1 prevents the vehicle from failing to accelerate from standstill due to internal locking of the gear shifting mechanism.

Furthermore, in this variation example, the torque capacity of the brake B1 is adjusted again according to the temperature of the hydraulic oil. Specifically, the rotational speed (of the motor generator MG) at which the torque capacity of the brake B1 starts to be reduced is set to an increasingly high value with a decrease in the temperature of the hydraulic oil. If the temperature of the hydraulic oil is low, the response of the brake B1 may become so poor that the reducing of the torque capacity of the brake B1 may be delayed. This potential problem is addressed by setting the rotational speed at which the torque capacity of the brake B1 starts to be reduced to an increasingly high value with a decrease in the temperature of the hydraulic oil. Hence, even if the response of the brake B1 is poor, the brake B1 is prevented from completely engaging and thereby reducing the rotational speed of the driving wheel T to 0 (the vehicle is stopped). The time when the torque capacity of the brake B1 starts to be reduced may be determined from an adjustment map prepared in advance by experiment or simulation or may be calculated using a predetermined computation formula. An adjustment map is a map that specifies a relationship between the temperature of the hydraulic oil and the time when the torque capacity of the brake B1 starts to be reduced.

Other Embodiments

The embodiment and variation examples described above are applications of the present invention to hybrid vehicles. The present invention is by no means limited to these embodiment and examples. Alternatively, the present invention is applicable to electric vehicles. More specifically, the present invention (the embodiment or variation example 2) may be applied to a power transmission path between a motor generator as a drive power source and a driving wheel.

The previous embodiment and variation examples described applications of the present invention to a hybrid vehicle including a single motor generator MG and a power train provided with a six-forward-speed automatic transmission 5. The present invention is by no means limited to this example, and alternatively applicable to various other types of hybrid and electric vehicles. Examples of such vehicles include those with a power train including an automatic transmission connected to the output of a continuously variable electric transmission as disclosed in JP 2010-18215A and JP 2010-58557A and those disclosed in US 2009/0082171A1, JP 2000-69611A, and JP 2000-62483A.

The pervious embodiment and variation examples described situations in which the vehicle moves backward despite a forward acceleration request made when the vehicle is stationary on an ascending slope. The present invention is by no means limited to these exemplary situations, and may also be applicable to a situation in which the vehicle moves backward while the vehicle is traveling forward on an ascending slope, a situation in which a backward acceleration request is made when the vehicle is stationary on a descending slope, and a situation in which the vehicle moves forward while the vehicle is traveling backward on a descending slope. Apart from traveling on ascending and descending slopes, the present invention is further applicable to traveling on sandy, rocky, or other bad roads and off-road driving.

INDUSTRIAL APPLICABILITY

The present invention is applicable to the control of a hybrid vehicle that includes an engaging/disengaging device on a power transmission path between a motor generator and a driving wheel, to ensure performance during acceleration from standstill.

REFERENCE SIGNS LIST

3 Battery (Electric Storage Device)
4 Hydraulic Control Device
50 HV-ECU
60 Engine ECU
70 MG-ECU
80 Battery ECU
90 Transmission ECU (Control Means)
C1 Clutch (Engaging/Disengaging Device)
E Engine (Internal Combustion Engine)
MG Motor Generator
T Driving Wheel (Wheel)
IS Input Shaft
OS Output Shaft

The invention claimed is:

1. A control device for a vehicle including a motor generator and a torque capacity-variable engaging/disengaging device disposed on a power transmission path between the motor generator and a wheel,
the control device comprising transmission electronic control unit,
wherein while the vehicle moves in a direction opposite a direction of travel of the vehicle when the motor generator is operating as an electric motor that generates a torque for the direction of travel, the transmission electronic control unit reduces a torque capacity of the engaging/disengaging device to lower a rotational speed of the motor generator as compared to when the engaging/disengaging device is engaged in the power transmission path.

2. The control device for the vehicle according to claim 1, further comprising an electric storage device that stores electric power generated by the motor generator,
wherein the transmission electronic control unit varies the torque capacity of the engaging/disengaging device in accordance with the electric power generated by the motor generator for storage in the electric storage device and with a maximum power storage level of the electric storage device.

3. The control device for the vehicle according to claim 2, wherein the transmission electronic control unit reduces the torque capacity of the engaging/disengaging device to lower the rotational speed of the motor generator so that the electric power generated by the motor generator for storage in the electric storage device does not exceed the maximum power storage level of the electric storage device.

4. The control device for the vehicle according to claim 1, wherein:
the transmission electronic control unit determines a quantity of heat absorbed by the engaging/disengaging device as a result of the transmission electronic control unit having varied the torque capacity of the engaging/disengaging device; and
while the quantity of the heat has reached a predetermined value, transmission electronic control unit stops varying the torque capacity of the engaging/disengaging device.

5. The control device for the vehicle according to claim 4, wherein the transmission electronic control unit progressively decreases an input torque to the engaging/disengaging device as the quantity of the heat approaches a maximum acceptable value as a result of the transmission electronic control unit having varied the torque capacity of the engaging/disengaging device.

6. The control device for the vehicle according to 5, wherein:
the direction of travel is a forward direction for the vehicle; and
while the vehicle moves backward when the vehicle is ascending a slope or when the vehicle starts forward acceleration from standstill on an ascending slope, the transmission electronic control unit varies the torque capacity of the engaging/disengaging device.

7. The control device for the vehicle according to 4, wherein:
the direction of travel is a forward direction for the vehicle; and
while the vehicle moves backward when the vehicle is ascending a slope or when the vehicle starts forward acceleration from standstill on an ascending slope, the transmission electronic control unit varies the torque capacity of the engaging/disengaging device.

8. A control device for a vehicle including an internal combustion engine, a motor generator, a first torque capacity-variable engaging/disengaging device disposed on a power transmission path between the internal combustion engine and the motor generator, and a second torque capacity-variable engaging/disengaging device disposed on a power transmission path between the motor generator and a wheel,
the control device comprising transmission electronic control unit,
wherein while the vehicle moves in a direction opposite a direction of travel of the vehicle when the motor generator is operating as an electric motor that generates a torque for the direction of travel, the transmission electronic control unit varies a torque capacity of the first engaging/disengaging device in accordance with reduction of a torque capacity of the second engaging/disengaging device in the power transmission path.

9. The control device for the vehicle according to claim 8, further comprising an electric storage device that stores electric power generated by the motor generator,
wherein the transmission electronic control unit varies the torque capacities of the first and second engaging/disengaging devices in accordance with the electric power generated by the motor generator for storage in the electric storage device and with a maximum power storage level of the electric storage device.

10. The control device for the vehicle according to claim 9, wherein the transmission electronic control unit varies the torque capacities of the first and second engaging/disengaging devices to lower a rotational speed of the motor generator so that the electric power generated by the motor generator for storage in the electric storage device does not exceed the maximum power storage level of the electric storage device.

11. The control device for the vehicle according to claim 8, wherein:
the transmission electronic control unit determines a quantity of heat absorbed by the engaging/disengaging devices as a result of the transmission electronic control unit having varied the torque capacities of the engaging/disengaging devices; and
while the quantity of the heat has reached a predetermined value, transmission electronic control unit stops varying the torque capacities of the engaging/disengaging devices.

12. The control device for the vehicle according to claim 11, wherein the transmission electronic control unit progressively decreases an input torque to the engaging/disengaging devices as the quantity of the heat approaches a maximum acceptable value as a result of the transmission electronic control unit having varied the torque capacities of the engaging/disengaging devices.

13. The control device for the vehicle according to claim 8, wherein:
the direction of travel is a forward direction for the vehicle; and
while the vehicle moves backward when the vehicle is ascending a slope or when the vehicle starts forward acceleration from standstill on an ascending slope, the transmission electronic control unit varies the torque capacities of the engaging/disengaging devices.

14. A control device for a vehicle including a motor generator and an engaging/disengaging device disposed on a power transmission path between the motor generator and a wheel, the engaging/disengaging device varying a torque capacity thereof to enable internal locking of the power transmission path,
the control device comprising transmission electronic control unit,
wherein while the vehicle moves in a direction opposite a direction of travel of the vehicle when the motor generator is operating as an electric motor that generates a torque for the direction of travel, the transmission electronic control unit increases the torque capacity of the engaging/disengaging device to generate a torque on the wheel for the direction of travel in the power transmission path.

15. The control device for the vehicle according to claim 14, further comprising an electric storage device that stores electric power generated by the motor generator,
wherein the transmission electronic control unit varies the torque capacity of the engaging/disengaging device in accordance with the electric power generated by the motor generator for storage in the electric storage device and with a maximum power storage level of the electric storage device.

16. The control device for the vehicle according to claim 15, wherein the transmission electronic control unit increases the torque capacity of the engaging/disengaging device to generate a torque on the wheel for the direction of travel so that the electric power generated by the motor generator for storage in the electric storage device does not exceed the maximum power storage level of the electric storage device.

17. The control device for the vehicle according to claim 16, wherein:
the direction of travel is a forward direction for the vehicle; and
while the vehicle moves backward when the vehicle is ascending a slope or when the vehicle starts forward acceleration from standstill on an ascending slope, the transmission electronic control unit varies the torque capacity of the engaging/disengaging device.

18. The control device for the vehicle according to claim 14, wherein:
the transmission electronic control unit determines a quantity of heat absorbed by the engaging/disengaging device as a result of the transmission electronic control unit having varied the torque capacity of the engaging/disengaging device; and
while the quantity of the heat has reached a predetermined value, transmission electronic control unit stops varying the torque capacity of the engaging/disengaging device.

19. The control device for the vehicle according to claim 18, wherein the transmission electronic control unit progressively decreases an input torque to the engaging/disengaging device as the quantity of the heat approaches a maximum acceptable value as a result of the transmission electronic control unit having varied the torque capacity of the engaging/disengaging device.

20. The control device for the vehicle according to claim 14, wherein:
the direction of travel is a forward direction for the vehicle; and
while the vehicle moves backward when the vehicle is ascending a slope or when the vehicle starts forward acceleration from standstill on an ascending slope, the transmission electronic control unit varies the torque capacity of the engaging/disengaging device.

* * * * *